Figure 1:
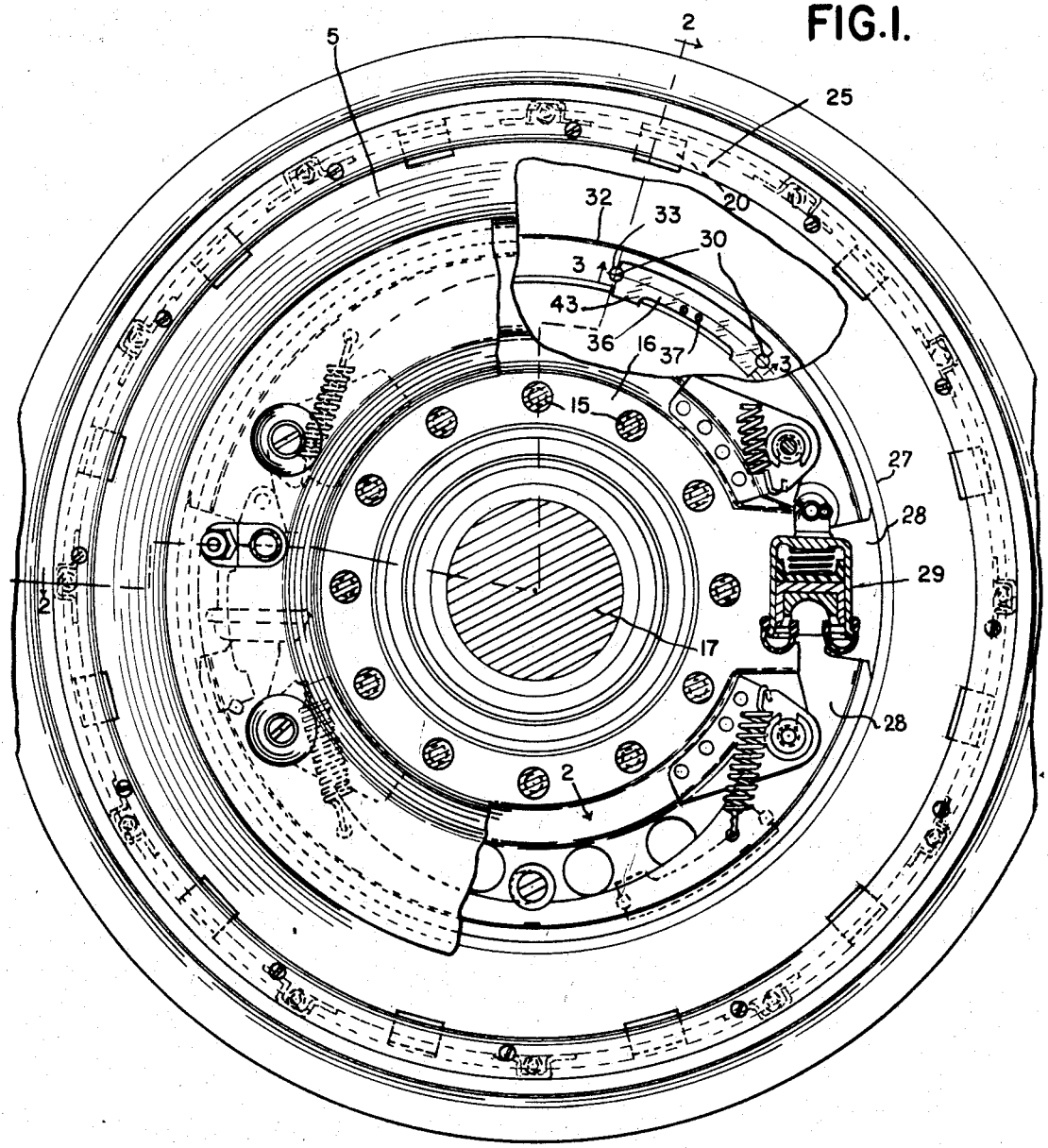

Aug. 22, 1944.    J. A. FORBES    2,356,234
BRAKE
Filed Nov. 16, 1942    2 Sheets-Sheet 1

FIG.I.

INVENTOR.
JOSEPH A. FORBES
BY
ATTORNEYS

Aug. 22, 1944.     J. A. FORBES     2,356,234

BRAKE

Filed Nov. 16, 1942     2 Sheets-Sheet 2

INVENTOR.
JOSEPH A. FORBES
BY

ATTORNEYS

Patented Aug. 22, 1944

2,356,234

UNITED STATES PATENT OFFICE 2,356,234

BRAKE

Joseph A. Forbes, Detroit, Mich., assignor to John Sneed, Royal Oak, Mich.

Application November 16, 1942, Serial No. 465,745

8 Claims. (Cl. 188—206)

The invention relates to brakes and refers more particularly to brakes for use with wheels, and especially airplane landing wheels.

The invention has for one of its objects to provide a brake which may be readily connected to or disconnected from a wheel while the latter is being mounted or demounted, thereby avoiding the necessity of having a brake and wheel unit which may be difficult to handle because of its weight.

The invention has for another object to detachably secure the friction member of the brake through which the braking thrust is directly transmitted to the wheel and the wheel together in a predetermined axial relation.

The invention has for further objects to provide means for automatically locking the brake friction member to the wheel when the latter is being mounted in operative relation to the brake; and to provide means for automatically releasing the locking means when the wheel is being demounted.

With these and other objects in view, the invention resides in the novel features of construction and combinations and arrangements of parts as more fully hereinafter set forth.

Figure 2:
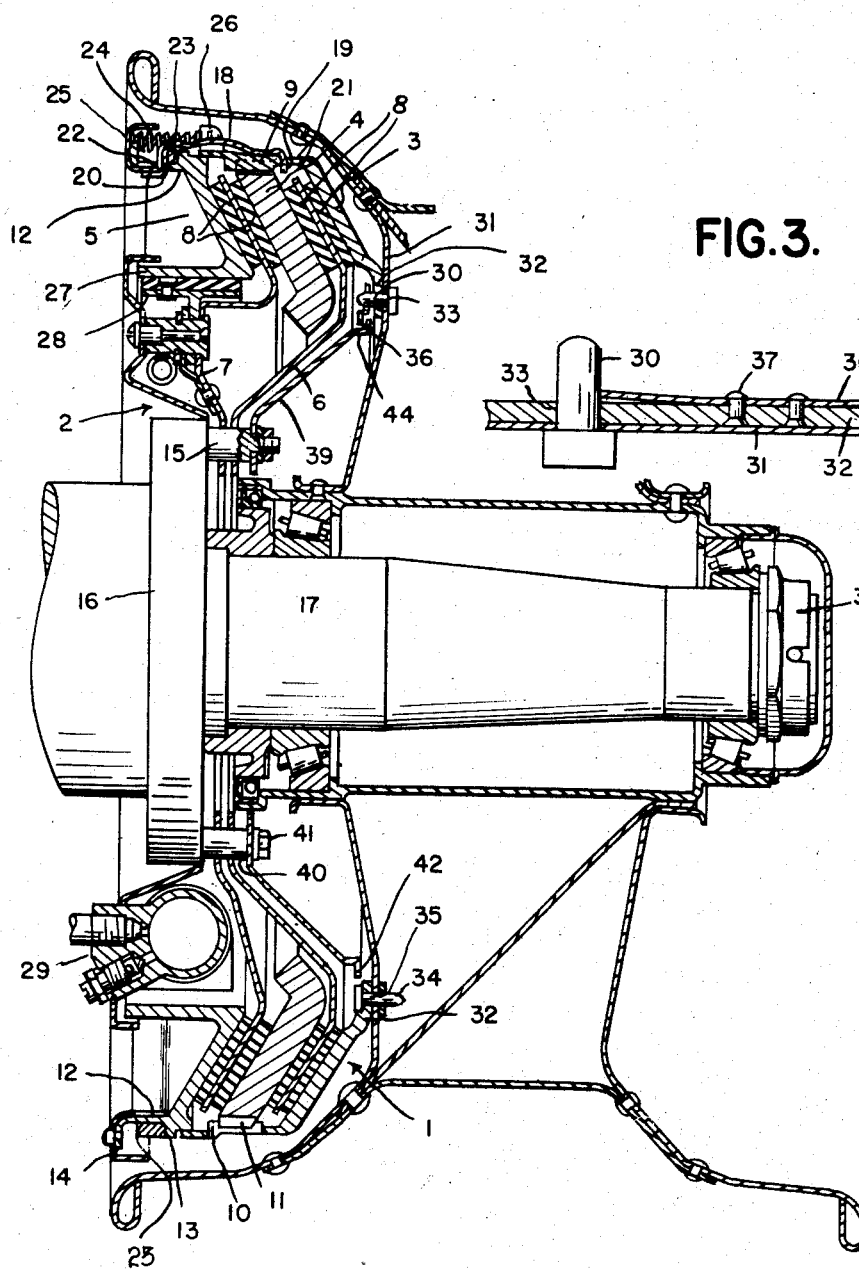
Figure 3:
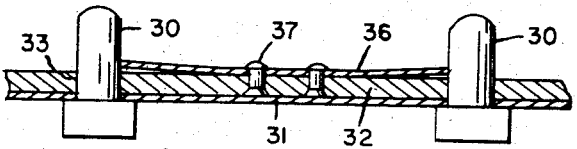

In the drawings:

Figure 1 is an inboard elevation, partly broken away, of a brake and wheel detachably secured to each other by mechanism embodying the invention;

Figures 2 and 3 are cross sections on the lines 2—2 and 3—3, respectively, of Figure 1.

As illustrated, the brake is of that type having the main brake mechanism 1 and the pilot brake mechanism 2 for applying the main brake mechanism. The main brake mechanism comprises the outboard intermediate and inboard rotatable friction members 3, 4 and 5, respectively, and the outboard and inboard non-rotatable friction members 6 and 7, respectively. The rotatable friction members have axially aligned frusto-conical disc portions for engaging the linings 8 on the opposite sides of corresponding frusto-conical disc portions of the non-rotatable friction members. The outboard rotatable friction member 3 has at the periphery of its frusto-conical disc portion the annular flange 9 which has the axially extending openings 10 for slidably receiving the projections 11 at the radially outer edge of the intermediate rotatable friction member. The inboard rotatable friction member has at its radially outer edge the annular flange 12 which extends within the inboard edge of the annular flange 9 and has beyond this inboard edge the radially outwardly extending outboard and inboard flanges 13 and 14, respectively. The outboard and inboard non-rotatable friction members 6 and 7 are axially slidably mounted on the studs 15 which extend axially in an outboard direction from the flange 16 of the support having the shaft 17 on which the wheel is journaled in a predetermined axial position.

The outboard rotatable friction member 3 is adapted to be driven with the wheel and normally the inboard rotatable friction member 5 is driven in unison with the outboard rotatable friction member through the links 18 which extend axially and are angularly spaced around the annular flange 9 and have inturned outboard and inboard ends 19 and 20, respectively. The outboard ends extend through the openings 21 in the annular flange 9 and the inboard ends extend through the openings 22 in the axial flange 12 and abut the cam ring 23. The cam ring is located at the inboard side of the outboard flange 13 and is rotatably adjustable to provide predetermined brake clearance between the rotatable and non-rotatable friction members. The outboard and inboard rotatable friction members are resiliently held away from each other in positions determined by the outboard and inboard ends of the links by the coil springs 24 which are located between the guard 25 secured to the inboard flange 14 and the brackets 26 secured to the inner edge portion of the annular flange 9. These springs serve to resiliently hold the links 18 in axial relation.

The pilot brake mechanism comprises the brake drum 27 which is preferably integral with the inboard rotatable friction member 5 and extends axially in an inboard direction from its inner edge. The pilot brake mechanism also comprises the brake shoes 28 which are mounted on the inboard non-rotatable friction member 7 and are adapted to be moved against the brake drum by suitable means, such as the diametrically opposite wheel cylinders 29.

The construction of brake comprising the main brake mechanism and the pilot brake mechanism forms a unit with the non-rotatable friction members axially slidably mounted on the support for the wheel and supporting the rotatable friction members, which latter are adapted to rotate in unison with the wheel when the latter is mounted on the support in operative relation to the brake. In operation, it will be seen that when braking fluid under pressure is forced into the wheel cylinders they force the brake shoes against the brake drum which retards the inboard rotatable friction member, it being assumed that the wheel is rotating. The retarding of the inboard rotatable friction member compels the links to move angularly which force the outboard and inboard rotatable friction members toward each other to cause frictional engagement between the outboard and inboard and intemediate rotatable friction members and the outboard and inboard non-rotatable friction members.

The brake, as thus far described, is the same as that of the John Sneed patent application Serial No. 418,790, filed November 12, 1941, on Brake.

The mechanism for securing the wheel and the brake together comprises the annular series of angularly spaced axial dowels 30 fixedly secured to the inboard disc element 31 of the wheel and projecting axially in an inboard direction through the back portion 32 at the radially inner edge of and integral with the frusto-conical disc portion of the outboard rotatable friction member 3, the back portion having the openings 33 for slidably receiving the dowels 30. The mechanism also comprises the annular series of dowels 34 fixedly secured to the back portion 32 and projecting axially in an outboard direction through the wheel inboard disc element 31 having the holes 35 for slidably receiving the dowels 34 which serve essentially to drive the outboard rotatable friction member in unison with the wheel. The dowels 30 are preferably arranged in pairs, as are also the dowels 34, and the pairs of dowels 30 alternate with the dowels 34. The mechanism also comprises the bowed springs 36 which are fixedly secured at their middles by suitable means, such as the rivets 37, to the inboard side of the back portion 32 approximately midway between the dowels 30 of each pair. The ends of these springs are preferably shaped to fit the dowels 30.

With the arrangement as thus far described, it will be seen that while the wheel is being mounted by axial movement in an inboard direction on to the shaft 17, the dowels 30 will slidably pass through the holes 33 in the back portion 32 and the dowels 34 will slidably pass through the holes 35 in the inboard disc element 31. The dowels 30 will also slidably engage the ends of the springs 36. When the wheel has reached its predetermined axial position on the shaft 17 it may be secured in any usual manner, as by means of the nut 38. With the wheel in this position, the outboard rotatable friction member 3 is manually moved in an outboard direction to move the back portion 32 into contact with the inboard disc element 31. The contact is maintained by the ends of the springs 36 frictionally engaging the dowels 30 and automatically holding the outboard rotatable friction member 3 on the dowels 30 and locking the outboard rotatable friction member to the inboard disc element of the wheel so that the two cannot be accidentally separated.

For the purpose of automatically releasing the springs 36 from the dowels 30 when the wheel is being demounted, I have provided the member 39. This member is in the nature of a dished disc fixedly secured to the support in predetermined axial relation thereto by reducing the outboard end portions of the studs 15 to form the annular shoulders 40 and by clamping the inner edge portion of the disc against the shoulders by the nuts 41 threaded on the outboard end portions. The disc has at its radially outer edge the radially outwardly extending annular flange 42 which is positioned at the outboard side of the radially inwardly extending projections 43 of each spring. These projections are located at the ends of each spring so that when the wheel is being pulled off its shaft the outboard rotatable friction member 3 and the springs 36 are moved axially in an outboard direction with the wheel until the projections 43 of the springs engage the flange 42. At this time the ends of the springs are held from any further axial movement in an outboard direction so that during the continued demounting of the wheel the springs are automatically released from their dowels. The disc member 39 also serves to approximately position the friction members of the main brake mechanism in relation to each other and to approximately center the outboard rotatable friction member when the wheel is demounted so that the wheel may be readily mounted. In detail, the disc member has the substantially cylindrical portion 44 which extends radially inside the spring projections 43 and is engageable therewith to approximately center the outboard rotatable friction member when the wheel is demounted. As a result, the other friction members of the main brake mechanism are held approximately in their proper relation. It will be noted that when the wheel and brake are in their correct positions the disc member clears the springs 36 and the back portion 32.

What I claim as my invention is:

1. Mechanism for securing a wheel and a brake having rotatable and non-rotatable friction members, said mechanism comprising dowels on the wheel slidably extending through a rotatable friction member, spring means on said rotatable friction member engageable with said dowels to lock said rotatable friction member to the wheel, and means engageable with said spring means to release the same from said dowels when the wheel is being demounted.

2. Mechanism for securing a wheel and a brake having relatively rotatable friction members engageable with each other, said mechanism comprising a dowel on the wheel, means on one of said members for slidably receiving said dowel when the wheel is being mounted in operative relation to the brake, and a spring upon the last mentioned member engageable with said dowel to hold the last mentioned member in engagement with said dowel.

3. Mechanism for securing a wheel and a brake having relatively rotatable friction members engageable with each other, said mechanism comprising angularly spaced axial dowels on the wheel, a back portion on one of the members having openings for slidably receiving said dowels when the wheel is being mounted in operative relation to the brake, springs upon the last mentioned member engageable with said dowels to hold the last mentioned member in engagement with said dowels, and a releasing member engageable with said springs to release the same from said dowels when the wheel is being demounted.

4. Mechanism for securing a wheel member and a rotatable friction member of a brake, said mechanism comprising projecting means on one of the members extending through the other of the members, and automatic means permanently secured to said other of the members and engageable with said projecting means to hold the members together.

5. Mechanism for securing a wheel member and a rotatable friction member of a brake, said mechanism comprising projecting means on one of the members extending through the other of the members, means engageable with said projecting means to hold the last mentioned member on said projecting means, and means for automatically releasing said holding means when the wheel member is being demounted.

6. Mechanism for securing a wheel and a brake mounted in operative relation on a support with the brake having rotatable and non-rotatable friction members engageable with each other and axially slidably mounted on the support, said mechanism comprising dowel means on the wheel extending through a rotatable friction member of the brake when the wheel is mounted on the support in operative relation to the brake, means engageable with said dowel means for locking the rotatable friction member to the wheel, and means mounted on the support for releasing said locking means when the wheel is being demounted from the support.

7. Mechanism for securing a wheel and a brake mounted in operative relation on a support with the brake having rotatable and non-rotatable friction members engageable with each other and axially slidably mounted on the support, said mechanism comprising dowel means on the wheel extending through a rotatable friction member of the brake when the wheel is mounted on the support in operative relation to the brake, spring means on the rotatable friction member engageable with said dowel means for locking the same to the wheel, and stop means fixedly mounted on the support and engageable with said spring means for releasing the same when the wheel is being demounted from the support.

8. Mechanism for securing a wheel and a brake having relatively rotatable friction members engageable with each other, said mechanism comprising a dowel on the wheel, means on one of said members for slidably receiving said dowel when the wheel is being mounted in operative relation to the brake, a spring upon the last mentioned member engageable with said dowel to hold the last mentioned member in engagement with said dowel, and means for approximately positioning said relatively rotatable friction members with respect to each other.

JOSEPH A. FORBES.